(12) United States Patent
Pyrcz et al.

(10) Patent No.: US 8,606,555 B2
(45) Date of Patent: Dec. 10, 2013

(54) SYSTEM AND METHOD FOR MODELING A GEOLOGIC VOLUME OF INTEREST

(75) Inventors: Michael J. Pyrcz, Humble, TX (US); Tim McHargue, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 370 days.

(21) Appl. No.: 12/604,932

(22) Filed: Oct. 23, 2009

(65) Prior Publication Data

US 2011/0098997 A1    Apr. 28, 2011

(51) Int. Cl.
*G06G 7/48* (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| | | | |
|---|---|---|---|
| 7,340,385 B2 * | 3/2008 | James | 703/10 |
| 7,369,980 B2 * | 5/2008 | Deffenbaugh et al. | 703/10 |
| 7,373,251 B2 | 5/2008 | Hamman et al. | |
| 7,996,198 B2 * | 8/2011 | Swanson et al. | 703/10 |
| 2006/0041409 A1 * | 2/2006 | Strebelle et al. | 703/10 |
| 2007/0219724 A1 | 9/2007 | Li et al. | |
| 2008/0021653 A1 | 1/2008 | Kear et al. | |
| 2009/0312995 A1 | 12/2009 | Pyrcz et al. | |
| 2011/0054869 A1 * | 3/2011 | Li et al. | 703/10 |
| 2011/0098930 A1 | 4/2011 | Pyrcz et al. | |

OTHER PUBLICATIONS

Kashib et al, "A Probabilistic Approach to Integrating Dynamic Data in Reservoir Models", Journal of Petroleum Science and Engineering, 50, pp. 241-257, 2006.*
Deutsch et al, "FLUVSIM: A Program for Object-Based Stochastic Modeling of Fluvial Depositional Systems", Computers and Geosciences 28, pp. 525-535, 2002.*
Deutsch et al, "Hierarchical Object-Based Geostatistical Modeling of Fluvial Reservoirs", SPE 36514, 1996 SPE Annual Technical Conference and Exhibition, Oct. 6-9, 1996.*
Doligez et al, "Quantification of Statistical Geological Parameters From Genetic Modeling of Channels", International Petroleum Technology Conference, IPTC 11732, 2007.*
Miller et al, "Direct Modeling of Reservoirs Through Forward Process-Based Models: Can We Get There?", IPTC 12729, International Petroleum Technology Conference, Dec. 3-5, 2008.*

(Continued)

*Primary Examiner* — Mary C Jacob
(74) *Attorney, Agent, or Firm* — Carlos Hanze; Albert Shung

(57) ABSTRACT

A model of a geologic volume of interest that represents the geological architecture of the geologic volume of interest is generated. The model is generated as a series of geologic events at a string of points in geologic time such that each event is deposited or eroded sequentially. A given geologic event is determined based on the topological and/or geological properties of the geologic volume of interest at the time of the geologic event, environmental conditions present at the time of the geologic event that impact geologic formation, deposition, and/or erosion, and/or other considerations. The given geologic event is further determined to honor, at least somewhat, local conditioning data that has been obtained during direct measurements of the geological parameters (and/or trends therein) within the geologic volume of interest.

18 Claims, 4 Drawing Sheets

(56) References Cited

OTHER PUBLICATIONS

Pranter et al, "Deepwater Reservoir Modeling Using Sequence-Stratigraphic and Geomorphic Constraints", SPE 95952, 2005 SPE Annual Technical Conference and Exhibition, 2005.*

Pyrcz et al, "Conditioning Event-Based Fluvial Models", Geostatistics Banff, pp. 135-144, 2004.*

Abrahamsen et al., Process based stochastic modeling of deep marine reservoirs Petroleum Geotatistics 2007, pp. 1-4.

Cojan et al., Process-based reservoir modelling in the example meandering channel, O. Leau Deutchs, eds., Geostatistics Banff 204, 2005, pp. 611-619, Springer.

Pyrcz, M.J. & Deutsch, C.V., Alluvsim: A program for Streamline-Based Stochastic Modeling of Fluvial Depositional Systems, Centre for Computational Geostatistics $6^{th}$ annual report. 2004 pp. 202-1-202-25.

* cited by examiner

SYSTEM AND METHOD FOR MODELING A GEOLOGIC VOLUME OF INTEREST

FIELD OF THE INVENTION

The invention relates to the stochastic modeling of a geologic volume of interest that conforms to local conditioning data derived from measurements of one or more geologic parameters of the geologic volume of interest.

BACKGROUND OF THE INVENTION

In techniques for modeling geological reservoirs, conditionality is a primary requirement of reservoir models. Not only should reservoir models honor statistics of property distributions and spatial heterogeneity, but also the local direct (e.g., well cores and logs, etc.) and indirect (e.g., seismic information, provenance, allogenic cycles, etc.) conditioning data. Without conditionality, reservoir models do not provide accurate predictions of reservoir response. In addition, due to the vast model space of potential heterogeneity results, it is not practical to expect coincidental model and conditioning data match.

SUMMARY OF THE INVENTION

One aspect of the invention relates to a system configured to model the geological architecture of a geologic volume of interest. In one embodiment, the system comprises electronic storage and one or more processors. The electronic storage is configured to store a model of a geologic volume of interest, wherein the stored model of the geologic volume of interest represents one or more geologic parameters of the geologic volume of interest as a function of position within the geologic volume of interest, wherein the model of the geologic volume of interest comprises a first event model of a first flow event within the geologic volume of interest, and wherein the first flow event corresponds to a first point in geologic time. The one or more processors are configured to execute one or more computer program modules. The computer program modules comprise a local conditioning data module, a constraint module, an event module, a selection module, and a model module. The local conditioning data module is configured to obtain local conditioning data related to a second flow event within the geologic volume of interest, wherein the local conditioning data is derived from measurements of at least one of the one or more geologic parameters of the geologic volume of interest represented in the model of the geologic volume of interest, and wherein the second flow event corresponds to a second point in geologic time that is subsequent to the first point in geologic time. The constraint module is configured to determine, for the second flow event, constraints on the one or more geologic parameters represented by the model of the geologic volume of interest, wherein the constraints are determined based on the local conditioning data related to the second flow event. The event module is configured to generate a plurality of second event models by stochastically determining for each of the second event models distributions of the one or more geologic parameters that conform to the constraints determined for the second flow event by the constraint module. The selection module is configured to select one of the plurality of second event models for incorporation into the model of the geologic volume of interest. The model module is configured to incorporate the selected second event model into the model of the geologic volume of interest.

Another aspect of the invention relates to a computer-method of modeling the geological architecture of a geologic volume of interest. The method is implemented in a computer system comprising one or more processors configured to execute one or more computer program modules. In one embodiment, the method comprises storing to an electronic storage medium that is accessible to the one or more processors, a model of a geologic volume of interest, wherein the stored model of the geologic volume of interest represents one or more geologic parameters of the geologic volume of interest as a function of position within the geologic volume of interest, wherein the model of the geologic volume of interest comprises a first event model of a first flow event within the geologic volume of interest, and wherein the first flow event corresponds to a first point in geologic time; obtaining local conditioning data related to a second flow event within the geologic volume of interest, wherein the local conditioning data is derived from measurements of at least one of the one or more geologic parameters of the geologic volume of interest represented in the model of the geologic volume of interest, and wherein the second flow event corresponds to a second point in geologic time that is subsequent to the first point in geologic time; determining, for the second flow event, constraints on the one or more geologic parameters represented by the model of the geologic volume of interest, wherein the constraints are determined based on the local conditioning data related to the second flow event; generating a plurality of second event models by stochastically determining for each of the second event models distributions of the one or more geologic parameters that conform to the constraints determined for the second flow event; selecting one of the plurality of second event models for incorporation into the model of the geologic volume of interest; and incorporating the selected second event model into the model of the geologic volume of interest.

Yet another aspect of the invention relates to a computer-method of modeling the geological architecture of a geologic volume of interest. The method is implemented in a computer system comprising one or more processors configured to execute one or more computer program modules. In one embodiment, the method comprises (a) initializing the generation of a model of a geologic volume of interest, wherein the model of the geologic volume of interest represents one or more geologic parameters of the geologic volume of interest as a function of position within the geologic volume of interest; (b) obtaining local conditioning data related to the geologic volume of interest, wherein the local conditioning data is derived from measurements of at least one of the one or more geologic parameters of the geologic volume of interest represented in the model of the geologic volume of interest; (c) determining constraints on the one or more geologic parameters represented by the model of the geologic volume of interest for a first flow event corresponding to a first point in geologic time, wherein the constraints are determined based on the local conditioning data; (d) stochastically generating a plurality of event models that represent the one or more geologic parameters of the first flow event as a function of position within the geologic volume of interest, wherein the distributions of the one or more geologic parameters within each of the plurality of event models are constrained by the constraints determined at operation (c); (e) selecting one of the plurality of event models for incorporation into the model of the geologic volume of interest; (f) incorporating the selected event model into the model of the geologic volume of interest; and (g) repeating operations (c)-(g) for at least one additional flow event within the geologic volume of interest corresponding to a point in geologic time subsequent to the first point in geologic time.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
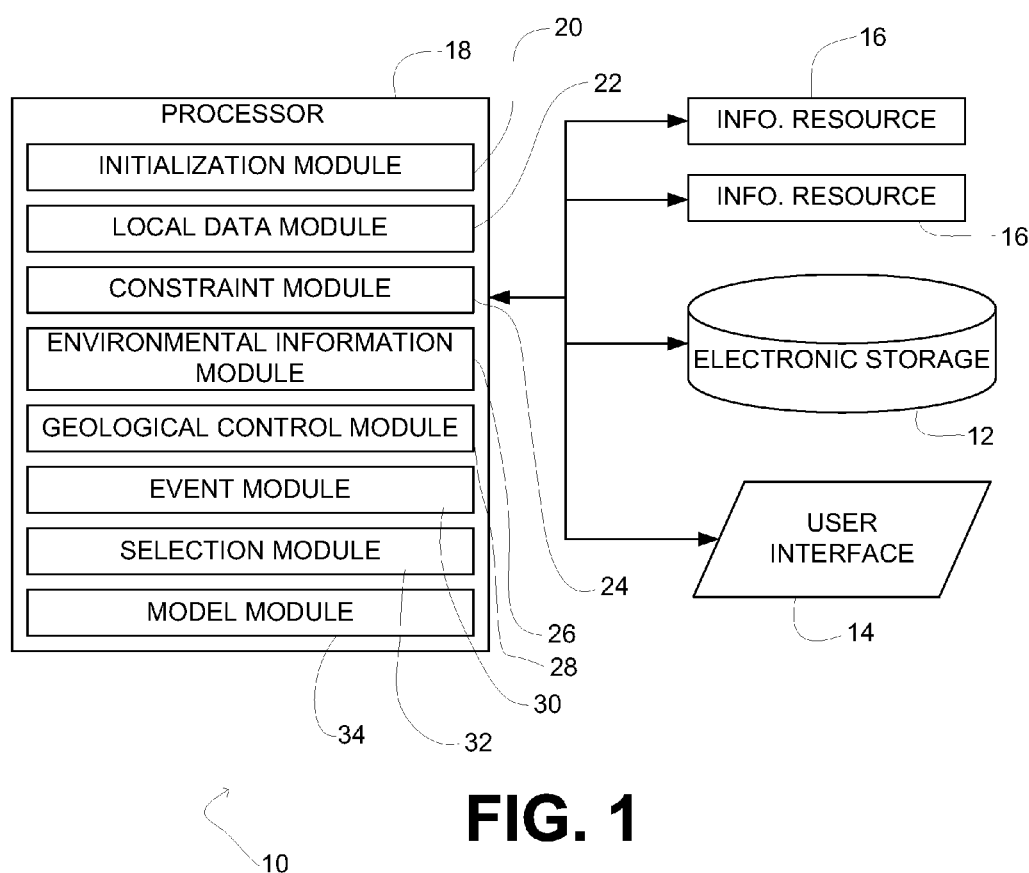
FIG. 1 illustrates a system configured to generate a model of a geologic volume of interest that represents the geological architecture of the geologic volume of interest, in accordance with one or more embodiments of the invention.

FIG. 1 illustrates a system 10 configured to generate a model of a geologic volume of interest that represents the geological architecture of the geologic volume of interest. The model generated by system 10 represents the geological architecture of the geologic volume of interest by representing geological parameters of the geologic volume of interest as a function of position within the geologic volume of interest. The model generated by system 10 is determined as a series of geologic events at a string of points in geologic time such that each event is deposited on top of the next. A geologic event may include a flow event. A flow event within a reservoir is the modification of the topography of the reservoir caused by a geobody within the reservoir. A given geologic event is determined based on the topological and/or geological properties of the geologic volume of interest at the time of the geologic event, environmental conditions present at the time of the geologic event that impact geologic formation, deposition, and/or erosion, and/or other considerations. The given geologic event is further determined to honor, at least somewhat, local conditioning data that has been obtained during direct measurements of the geological parameters (and/or trends therein) within the geologic volume of interest. In one embodiment, system 10 comprises electronic storage 12, a user interface 14, one or more information resources 16, one or more processors 18, and/or other components.

In one embodiment, electronic storage 12 comprises electronic storage media that electronically stores information. The electronic storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor 18, information received via user interface 14, information received from information resources 16, and/or other information that enables system 10 to function properly. Electronic storage 12 may be a separate component within system 10, or electronic storage 12 may be provided integrally with one or more other components of system 10 (e.g., processor 18).

User interface 14 is configured to provide an interface between system 10 and a user through which the user may provide information to and receive information from system 10. This enables data, results, and/or instructions and any other communicable items, collectively referred to as "information," to be communicated between the user and the system 10. As used herein, the term "user" may refer to a single individual or a group of individuals who may be working in coordination. Examples of interface devices suitable for inclusion in user interface 14 include a keypad, buttons, switches, a keyboard, knobs, levers, a display screen, a touch screen, speakers, a microphone, an indicator light, an audible alarm, and a printer. In one embodiment, user interface 14 actually includes a plurality of separate interfaces.

It is to be understood that other communication techniques, either hard-wired or wireless, are also contemplated by the present invention as user interface 14. For example, the present invention contemplates that user interface 14 may be integrated with a removable storage interface provided by electronic storage 12. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

The information resources 16 include one or more sources of information related to the geologic volume of interest and/or the process of modeling the geological architecture of geologic volume of interest. By way of non-limiting example, one of information resources 16 may include information related to environmental conditions present at the geologic volume of interest during the deposition, formation, and/or erosion of events within the geologic volume of interest. As is discussed further below, this information may be implemented in the modeling of the individual events.

As another non-limiting example of information resources 16, one of information resources 16 may include a dataset including local conditioning data for one or more geological volumes. As used herein, "local conditioning data" refers to measurements taken at a geologic volume of one or more geologic parameters of the geologic volume, and/or trends or distribution characteristics of geologic parameter(s). For instance, "local conditioning data" may include measurements taken from equipment positioned within one or more wells drilled at or near a geologic volume, seismic data (or information derived therefrom) acquired at the surface at or near a geologic volume, and/or other measurements of one or more characteristics of a geologic volume.

Processor 18 is configured to provide information processing capabilities in system 10. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device or computing platform, or processor 18 may represent processing functionality of a plurality of devices operating in coordination.

As is shown in FIG. 1, processor 18 may be configured to execute one or more computer program modules. The one or more computer program modules may include one or more of an initialization module 20, a local data module 22, a constraint module 24, an environmental information module 26, a geologic control module 28, an event module 30, a selection module 32, a model module 34, and/or other modules. Processor 18 may be configured to execute modules 20, 22, 24, 26, 28, 30, 32, and/or 34 by software; hardware; firmware; some combination of software, hardware, and/or firmware; and/or other mechanisms for configuring processing capabilities on processor 18.

It should be appreciated that although modules 20, 22, 24, 26, 28, 30, 32, and 34 are illustrated in FIG. 1 as being co-located within a single processing unit, in implementations in which processor 18 includes multiple processing units, one or more of modules 20, 22, 24, 26, 28, 30, 32, and/or 34 may be located remotely from the other modules. The description of the functionality provided by the different modules 20, 22, 24, 26, 28, 30, 32, and/or 34 described below is for illustrative purposes, and is not intended to be limiting, as any of modules 20, 22, 24, 26, 28, 30, 32, and/or 34 may provide more or less functionality than is described. For example, one or more of modules 20, 22, 24, 26, 28, 30, 32, and/or 34 may be eliminated, and some or all of its functionality may be provided by other ones of modules 20, 22, 24, 26, 28, 30, 32, and/or 34. As another example, processor 18 may be configured to execute one or more additional modules that may perform some or all of the functionality attributed below to one of modules 20, 22, 24, 26, 28, 30, 32, and/or 34.

In one embodiment, initialization module 20 is configured to initialize a generation of a model of the geologic volume of interest by system 10. As was mentioned above, the model of the geologic volume of interest represents one or more of the geologic parameters of the geologic volume of interest as a function of position within the geologic volume of interest. By way of non-limiting example, the one or more geologic parameters, and/or the trends or distributions thereof, describe one or more of flow source, channel size parameter, a fractional fill parameter, an equilibrium profile, channel morphology spectrum, sinuosity, flow composition, channel fill heterogeneity and/or trends, substrate erodability, an aggradation rate, flow volume and/or momentum, and/or other geologic parameters.

In order to initialize the generation of the model, initialization module 20 obtains initialization parameters for the model to be generated. For example, the initialization parameters may include parameters related to the reservoir type and scale of the geologic volume of interest (e.g., deepwater slope valley complex set, deepwater weakly confined channels, fluvial meander channel belt, fluvial braided channel complex, and/or other types), parameters related to the size and/or shape of the geologic volume of interest, parameters related to the geo-location of the geologic volume of interest, and/or other parameters. One or more of the initialization parameters may be accessed by initialization module 20 from electronic storage 12 (where they were previously stored), received from a user via user interface 14, received from one or more of information resources 16, and/or otherwise obtained.

To initialize the generation of the model, initialization module 20 may provide a baseline architecture upon which the events that make up the model can be positioned. The initialization module 20 may generate the baseline architecture based on at least some of the initialization parameters. The initialization module 20 may obtain the baseline architecture (e.g., from electronic storage 12, via user interface 14, from information resources 16, etc.) based on the initialization parameters. For example, a set of possible baseline architectures may be accessed to obtain the baseline architecture that corresponds to the initialization parameters for the geologic volume of interest.

The local data module 22 is configured to obtain local conditioning data related to the geologic volume of interest. The local conditioning data may be obtained from one of information resources 16. The local data module 22 may store the local conditioning data to electronic storage 12 for use by the modules of processor 18 in modeling the geologic volume of interest. In one embodiment, as a given event within the geologic volume of interest is being modeled, local data module 22 obtains local conditioning data (e.g., from one of information resources 16, from data previously stored to electronic storage 12, etc.) pertaining to the given event.

In one embodiment, local data module 22 is configured to implement techniques for interpreting local conditioning to assign the likelihood of specific architectures that may honor this data. In one embodiment, local data module 22 assigns specific architectures likelihoods corresponding to local conditioning data, and converts this into a probability of this data being honored by the resulting architecture model.

The constraint module 24 is configured to determine one or more constraints for one or more of the geologic parameters represented by the model of the geologic volume of interest being generated by system 10. A given constraint may directly constrain a geologic parameter, or may constrain a trend in a geologic parameter. For example, the distribution of event thickness in wells may constrain the thickness distribution of events, the frequency of amalgamated stacking or underfilled fill features in wells may constrain the frequency of events to exhibit organized stacking patterns, the frequency of isolated or overfilled events in wells may constrain the frequency of disorganized patterns or avulsion, the presence of bathymetry/topographic controls may constrain the source, orientations, geometries, and/or morphologies of events, and/or other geologic parameters may be constrained. The constraints are based on the local conditioning data, and are determined to facilitate conformance of the model to the local conditioning data.

Since system 10 generates the model of the geologic volume of interest event-by-event, in one embodiment, constraint module 24 operates in the same manner to determine constraints individually for the modeled events. In this embodiment, just prior to the generation of a model for a given event, constraint module 24 determines one or more constraints for one or more of the geologic parameters within the given event. These constraints are determined based on the topologic and/or geologic features of the model of the geologic volume of interest subsequent to the given event (or based on the baseline architecture if the given event is the first event), local conditioning data corresponding to the given event and/or adjacent events, wells with no channel sand present may prevent, avulse or repulse subsequent events from crossing the well trajectory, a channel intercept of a specific thickness may constrain the actual thickness of the subsequent channel or force regression or progradation of the associated architectures, amalgamated stacking or underfilled channel fill of channels in the wells may constrain the subsequent events to exhibit organized stacking patterns, abandoned channel fills may constrain the location of channel avulsions and meander loop cutoffs, overbank facies may constrain the proximity of subsequent channels, seismic indicators may be coded as erodability constraints to limit the placement of events and/or other information may be implemented as constraints. By way of non-limiting example, the constraints determined by constraint module 24 may constrain one or more of the erodibility, event geometry, gradient, and/or other parameters or trends in parameters.

One or more of the constraints determined by constraint module 24 may be, at least in part, a function of position within the geologic volume of interest. For example, a constraint may limit or constrain the determination of geologic parameters locally around a well-bore from which local conditioning data has been acquired. Such a constraint may have a hard boundary, or the impact of the constraint may fall off gradually as distance from the well-bore (or other constraint epicenter or source) increases. These "soft" boundaries may enhance the realism of the model in conforming to local conditioning data, in some instances.

The environmental information module 26 is configured to obtain information related to environmental conditions that impacted the geologic volume of interest. For example, such information may include one or more of sea level, one or more tectonic conditions, one or more climate conditions (e.g., humidity, precipitation, temperature, wind conditions, dew point, etc.), a distribution of sediment types, discharge (e.g., the volume and/or composition of geologic materials and water entering the geologic volume of interest), and/or other environmental conditions. The environmental information module 26 may obtain such information from one or more of information resources 16, user interface 14, may access previously stored information from electronic storage 12, and/or may obtain environmental information from other sources. Information obtained by environmental information module 26 from information resources 16, user interface 14, and/or other sources may be stored by environmental information module 26 to electronic storage 12 for further access.

Since system 10 generates the model of the geologic volume of interest event-by-event, in one embodiment, environmental information module 26 operates to access on an event-by-event basis to obtain information related to environmental conditions for individual events (or sets of events). By way of example, as system 10 prepares to generate a model of a given event within the geologic volume of interest, environmental information module 26 obtains information related to the environmental conditions prevalent at the point in geologic time that corresponds to the given event.

The geologic control module 28 is configured to quantify the impact of the information related to environmental conditions obtained by environmental information module 26 on the geologic architecture of the geologic volume of interest. The quantification of this impact enables the model of the geologic volume of interest generated by system 10 to reflect the environmental conditions present as the geologic volume of interest was formed.

In one embodiment, the quantification of the impact of the information related to environmental conditions is made by geologic control module 28 on an event-by-event basis. Prior to the generation of the model of a given event, geologic control module 28 quantifies the impact of the environmental conditions present at the point in geologic time corresponding to the given event on the geologic parameters of the given event. This quantification may include the determination of one or more constraints on the geologic parameters of the given event, one or more constraints on trends in the geologic parameters of the given event, and/or one or more variables that impacts the distribution of the one or more geologic parameters within the given event. For example, for the given event, geologic control module 28 may determine one or more constraints on an architectural element size (e.g., a channel size), fractional fill, equilibrium profile, channel spectrum and/or sinuosity, channel fill trends, erodability, aggradation rate, and/or other constraints that impact the distribution of geologic parameters within the given event. By way of non-limiting example, in one embodiment, geologic control module 28 quantifies the impact of the information related to environmental conditions in the manner described in U.S. patent application Ser. No. 12/140,901, which is hereby incorporated by reference into this disclosure in its entirety. Additionally, U.S. patent application Ser. No. 12/604,971, which discloses a system and method for estimating geological architecture of a geologic volume of interest, is hereby incorporated by reference into this disclosure in its entirety.

The event module 30 is configured to stochastically generate models of individual events within the geologic volume of interest. To generate a model of a given event within the geologic volume of interest, the event module 30 stochastically determines a distribution of geologic parameters as a function of position within the geologic volume of interest that corresponds to an event flow from proximal to distal. The generation of the model by event module 30 dynamically self-positions the event flow, and is governed by rules related to energy, inertia, and gradient. As such, the generation of the model of the given event is based on topologic and/or geologic parameters of the model of the geologic volume of interest at the point in geologic time that corresponds to the given event. This means that the topologic and/or geologic parameters of previously modeled flow events (occurring previously in geologic time) impact the model of the given event. In generating the stochastic distributions of the geologic parameters within the geologic volume of interest for the given event, event module 30 implements the quantification of the impact of environmental conditions on the given event determined by geologic control module 28, and conforms to the constraints determined for the given event by constraint module 24. For the given event, event module 30 generates a plurality of separate event models, each having a different stochastically determined distribution of the one or more geologic parameters within the given event as a function of position within the geologic volume of interest.

The selection module 32 is configured to select from among a plurality of event models determined for a given event so that the selected event can be incorporated into the model of the geologic volume of interest. In one embodiment, to select from among the plurality of event models, selection module 32 individually weights the event models based on the likelihood of the distributions of the one or more parameters within the event models corresponding to the actual distributions of the one or more parameters within the geologic volume of interest. The weights are determined based on the conformance of the individual event models to the local conditioning data.

Once the event models have been weighted, one of the event models is stochastically selected. While this selection is stochastic, it is also weighted by the individual weights determined by selection module 32. Thus, an event model with relatively bad conformance to the local conditioning data may be selected, but this selection would be highly unlikely due to the low weight that would likely be assigned to this event model. In one embodiment, some of the generated event models may be discarded from the selection process based on bad conformance with the local conditioning data. In one embodiment, selection module 32 considers constraints related to subsequent events beyond the current event. This may enhance the ability of system 10 to avoid becoming trapped in a subsequent event configuration that cannot honor conditioning data. In one embodiment, selection module 32 may regressively reject previous events and allow system 10 to improve global conditioning.

In one embodiment, constraint module 24 determines the constraints, event module 30 generates all of the event models from the same set of constraints, and then selection module 32 selects one of the event models. However, this is not intended to be limiting. For example, in one embodiment, during the generation of a plurality of events by event module 30, the constraints implemented by event module 30 are updated in an ongoing basis by constraint module 24. In such an embodiment, selection module 32 may determine the likelihood of a given event model just after generation by event module 30. Based on the likelihood determined by selection module 32, the constraints may be updated by constraint module 24.

For instance, if the likelihood that the given event model corresponds to the actual event within geologic volume of interest being modeled is relatively high, constraint module 24 may update the constraints so that future events generated by event module 30 will likely be similar to the given event model. As will be appreciated, this technique of dynamically updating constraints for an event in an ongoing manner will cause the iterative generation of event models generated by event module 30 to converge to event modules with high likelihoods of correspondence. This may enhance the generation of the event models with respect to a technique in which the iterations are made with a uniform set of constraints.

In one embodiment, event module 30 implements a previously generated event model with a high likelihood of correspondence to generate another event model. For example, rather than generating a given event model "from scratch," event module 30 may perturb the parameters and/or position of the previously generated event module, while still conforming to the constraints, to determine the given event model. The perturbation of the parameters and/or position of the previously generated event model may, for example, include aggregating (e.g., through averaging, weighted averaging, genetic combination, etc.) the parameters and/or position of the previously generated event model with one or more other previously generated event models or segmenting a given model (removal and remodeling of portions of the event model). In this method likelihood and selection are conducted on portions of the event model as opposed to the event model in its entirety. Other embodiments that enable generation of event models by event module 30 based on dynamic constraints and/or by leveraging previously generated event models are contemplated.

Figure 2:
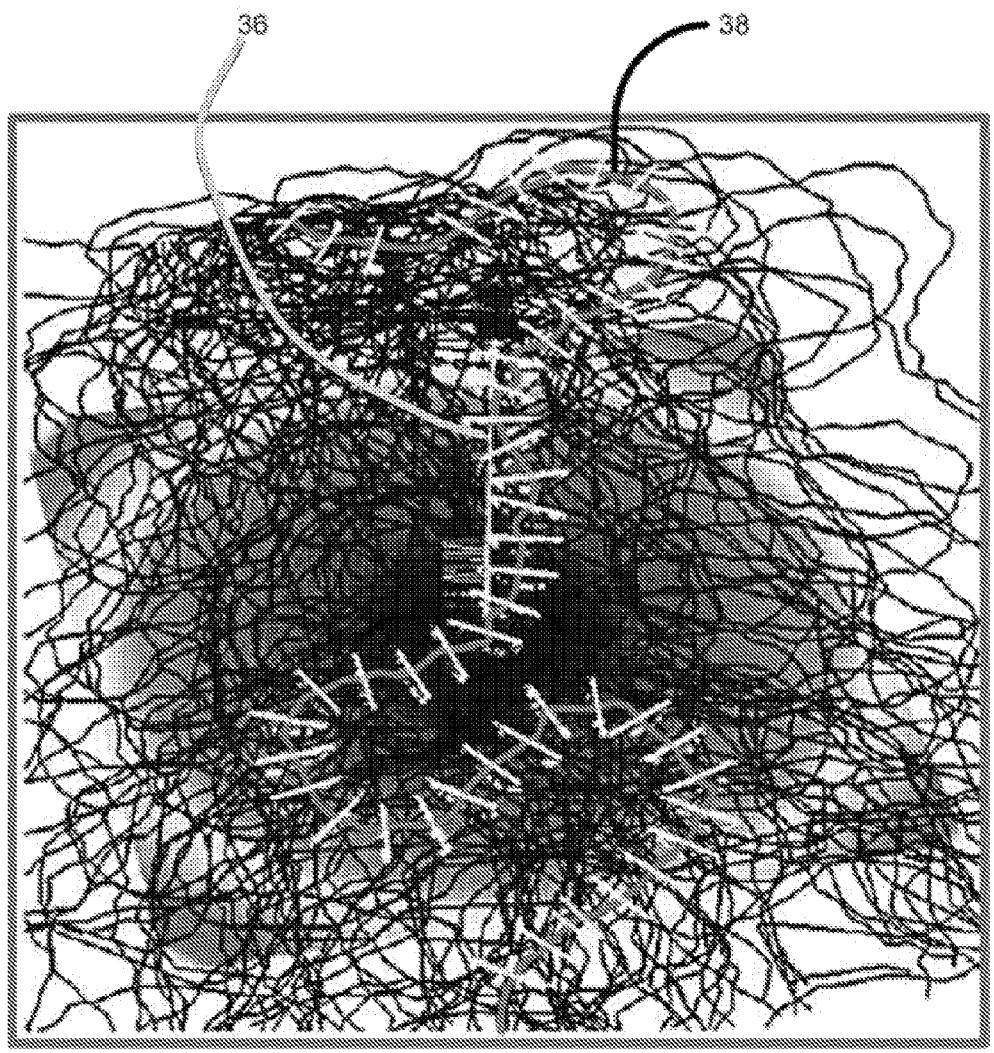
FIG. 2 illustrates an example well within a geologic volume of interest, a plurality of event centerlines of event models for a single event included in the geologic volume of interest, and the corresponding channel intercepts with the example well, according to one or more embodiments of the invention.

By way of illustration, FIG. 2 depicts an example well 36 within a geologic volume of interest. FIG. 2 further shows a plurality of event centerlines of event models for a single event, and the corresponding channel intercepts with well 36. A weighting on proximity to the well of the event models corresponding to the illustrated event centerlines is illustrated by the shaded surface. A selected event model centerline 38 is also shown, having been selected stochastically based on the weightings assigned to the individual event models.

Returning to FIG. 1, the model module 34 is configured to incorporate selected event models into the model of the geologic volume of interest. Incorporation of a selected event model includes positioning the selected event model in the model of the geologic volume of interest on top of previously modeled events (or the baseline architecture for the first event model). The model module 34 may adjust the distribution of one or more of the geologic parameters within the selected event module to enhance conformance to the local conditioning data. The model module 34 may adjust the distribution of one or more of the geologic parameters within the selected event module to ensure that inclusion of subsequent event models in the model of the geologic volume of interest will not degrade conformance of the selected event module with the local conditioning data. For example, model module 34 may constrain one or more of the geologic parameters within the selected module (e.g., erodibility, topography, gradient, etc.) so that subsequent events do not result in changes in the selected event model that degrade conformance to the local conditioning data.

Figure 3:
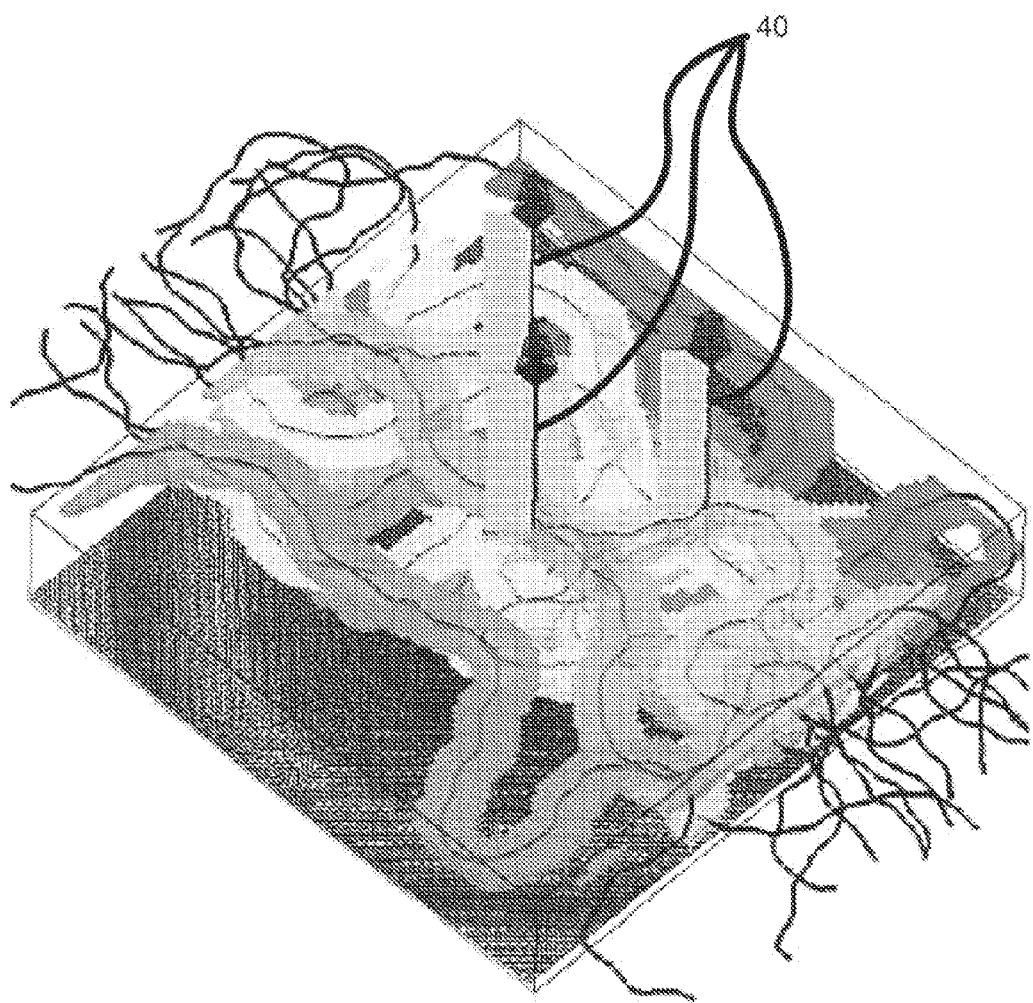
FIG. 3 illustrates a model of a geologic volume of interest that includes fifteen event models, in accordance with one or more embodiments of the invention.

FIG. 3 illustrates a model of a geologic volume of interest that includes fifteen event models (shown with corresponding centerlines). The fifteen event models have been generated and selected in accordance with the technique described above with respect to system 10 (shown in FIG. 1 and described above). Subsequent to the selection of the individual event models, convergence to the local conditioning data associated with three wells 40 has been added by relatively small adjustments made by a model module similar to or the same as model module 34 (shown in FIG. 1 and described above).

Figure 4:
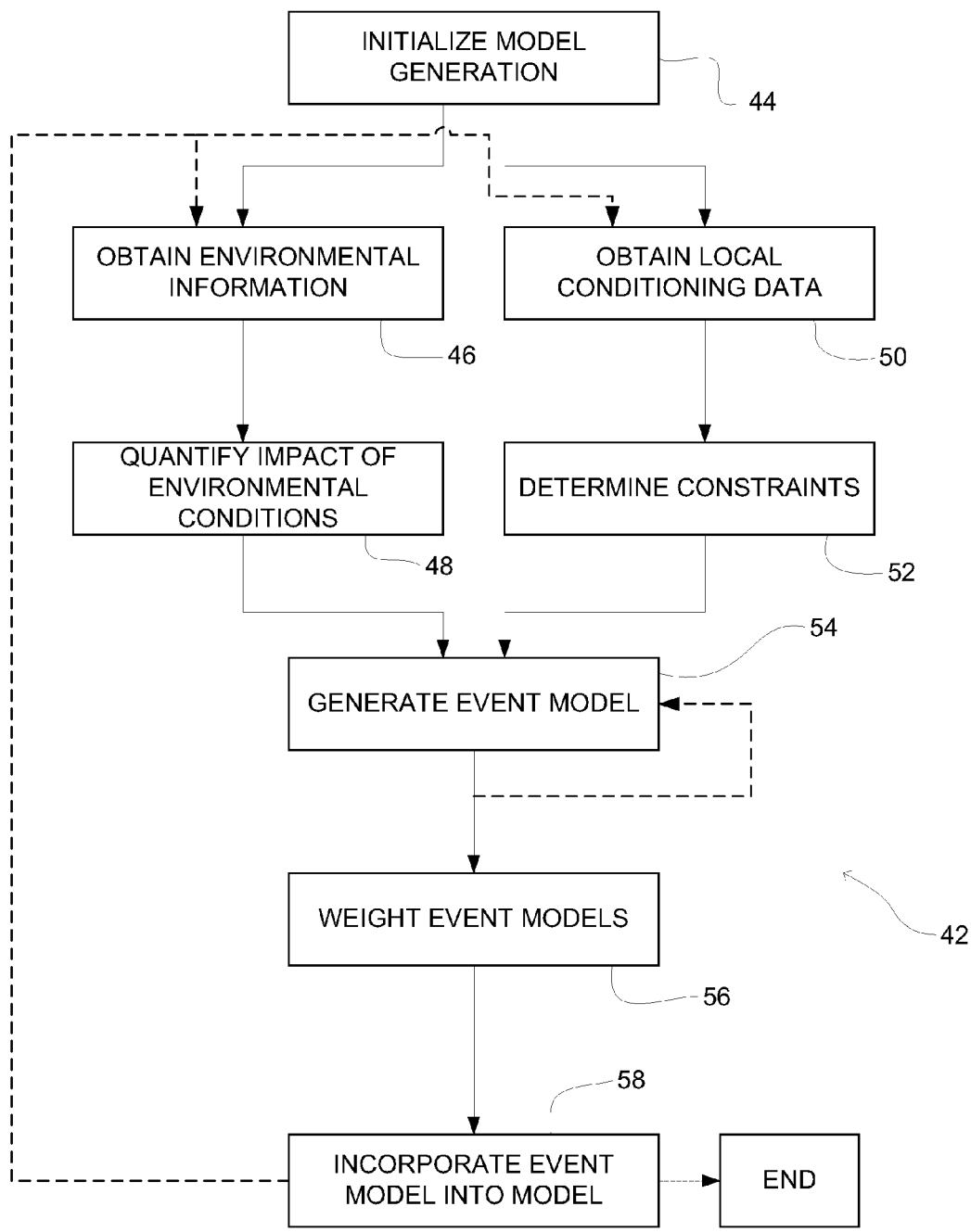
FIG. 4 illustrates a method of modeling the geological architecture of a geologic volume of interest, according to one or more embodiments of the invention.

FIG. 4 illustrates a method 42 of modeling the geological architecture of a geologic volume of interest. Method 42 results in the generation of a model of the geologic volume of interest that represents one or more geologic parameters of the geologic volume of interest as a function of position within the geologic volume of interest. The operations of method 42 presented below are intended to be illustrative. In some embodiments, method 42 may be accomplished with one or more additional operations not described, and/or without one or more of the operations discussed. Additionally, the order in which the operations of method 42 are illustrated in FIG. 4 and described below is not intended to be limiting.

In some embodiments, method 42 may be implemented in one or more processors of a computing system (e.g., a digital processor, an analog processor, a digital circuit designed to process information, an analog circuit designed to process information, a state machine, and/or other mechanisms for electronically processing information). The one or more processors may include one or more devices executing some or all of the operations of method 42 in response to instructions stored electronically on an electronic storage medium. The one or more processing devices may include one or more devices configured through hardware, firmware, and/or software to be specifically designed for execution of one or more of the operations of method 42.

At an operation 44, the generation of the model of the geologic volume of interest is initialized. This may include obtaining initialization information related to the geologic volume of interest. By way of non-limiting example, the initialization information may include initialization parameters such as parameters related to the reservoir type and scale of the geologic volume of interest (e.g., deepwater slope valley complex set, deepwater weakly confined channels, fluvial meander channel belt, fluvial braided channel complex, and/or other types), parameters related to the size and/or shape of the geologic volume of interest, parameters related to the geo-location of the geologic volume of interest, and/or other parameters. Initializing the generation of the model of the geologic volume of interest may include providing a baseline architecture upon which the model will be built. In one embodiment, operation 44 is performed by an initialization module that is the same as or similar to initialization module 20 (shown in FIG. 1 and described above).

At an operation 46, local conditioning data related to a first event within the geologic volume of interest is obtained. In one embodiment, operation 46 is performed by a local data module that is the same as or similar to local data module 22 (shown in FIG. 1 and described above).

At an operation 48, constraints on the distribution of the one or more geologic parameters represented by the model of the geologic volume of interest within an event model of the first event are determined. The constraints are determined based on the local conditioning data related to the first event obtained at operation 46. In one embodiment, operation 48 is performed by a constraint module that is the same as or similar to constraint module 24 (shown in FIG. 1 and described above).

At an operation 50, information related to environmental conditions present at a point in geologic time that corresponds to the first event is obtained. The environmental conditions may include one or more of sea level, one or more tectonic conditions, one or more climate conditions (e.g., humidity, temperature, wind conditions, dew point, etc.), a distribution of sediment types, discharge (e.g., the volume and/or composition of geologic materials and water entering the geologic volume of interest), and/or other environmental conditions. In one embodiment, operation 50 is performed by an environmental information module that is the same as or similar to environmental information module 26 (shown in FIG. 1 and described above).

At an operation 52, the impact of the environmental conditions present at the time that the first event was formed is quantified. This quantification may be based on the information obtained at operation 50. In one embodiment, operation 52 is performed by a geologic control module that is the same as or similar to geologic control module 28 (shown in FIG. 1 and described above).

At an operation 54, an event model for the first event is generated. The event model represents one or more geologic parameters of the first event as a function of position within the geologic volume of interest. The distribution of the one or more geologic parameters within the first event conform to the constraints determined at operation 48 are stochastic, and reflect the quantification of the environmental conditions present at the time of the first event determined at operation 52. In one embodiment, operation 54 is performed by an event module 30 that is the same as or similar to event module 30 (shown in FIG. 1 and described above).

Method 42 then loops back to operation 54 to stochastically generate a plurality of event models for the first event. In one embodiment, the loop may be performed to result in the generation of a predetermined number of event models for the first event. The predetermined number may be based on user input and may be updated by the performance of the events with respect to conditioning data match. Once the loop back over operation 54 is complete for the first event, method 42 proceeds to an operation 56.

At an operation 56, one of the event models is selected for the first event. The selection of an event model for the first event is stochastic, but is weighted based on the weightings such that event models that conform more closely to the local conditioning data for the geologic volume of interest are more likely to be selected. The weights may be based on a relative weighting, or the weights may be based on an absolute scale that quantifies conformance with local conditioning data. In one embodiment, operation 56 is performed by a selection module that is the same as or similar to selection module 32 (shown in FIG. 1 and described above).

At an operation 56, one of the event models is selected for the first event. The selection of an event model for the first event is stochastic, but is weighted based on the weightings determined at operation 54 such that event models that conform more closely to the local conditioning data are more likely to be selected at operation 56. In one embodiment, operation 56 is performed by a selection module that is the same as or similar to selection module 32 (shown in FIG. 1 and described above).

At an operation 58, the event model selected at operation 56 is incorporated into the model of the geologic volume of interest. Incorporation of the model of the geologic volume of interest includes adjusting the one or more geologic parameters to conform more closely with the local conditioning data. Incorporation of the model of the geologic volume of interest may include adjusting the one or more geologic parameters (and/or the properties or distributions thereof) to ensure that the incorporation of additional event models into the model of the geologic volume of interest does not degrade conformance of the selected event model and the local conditioning data. In one embodiment, operation 58 is performed by a model module that is the same as or similar to model module 34 (shown in FIG. 1 and described above).

Method 42 then loops back over operations 46, 48, 50, 52, 54, 56, and/or 58 to generate event models for subsequent events within the geologic volume of interest (e.g., a second event, a third event, etc.) until the model of the geologic volume of interest is complete. Once the model of the geologic volume of interest is complete, method 42 is ended.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to model the geological architecture of a geologic volume of interest, the system comprising:
electronic storage configured to store a model of a geologic volume of interest, wherein the stored model of the geologic volume of interest represents one or more geologic parameters of the geologic volume of interest as a function of position within the geologic volume of interest, wherein the model of the geologic volume of interest comprises a first event model of a first flow event within the geologic volume of interest, and wherein the first flow event corresponds to a first point in geologic time;
one or more processors configured to execute one or more computer program modules, the computer program modules comprising:

a local conditioning data module configured to obtain local conditioning data related to a second flow event within the geologic volume of interest, wherein the local conditioning data is derived from measurements of at least one of the one or more geologic parameters of the geologic volume of interest represented in the model of the geologic volume of interest, and wherein the second flow event corresponds to a second point in geologic time that is subsequent to the first point in geologic time;

a constraint module configured to determine, for the second flow event, constraints on the one or more geologic parameters represented by the model of the geologic volume of interest, wherein the constraints are determined based on the local conditioning data related to the second flow event;

an event module configured to generate a plurality of second event models, wherein the event module dynamically self-positions the second flow event during generation of each second event model from a proximal end to a distal end of the geologic volume of interest based on one or more geologic parameters determined by the constraint module, and one or more environmental conditions;

a selection module configured to select one of the plurality of second event models for incorporation into the model of the geologic volume of interest; and a model module configured to incorporate the selected second event model into the model of the geologic volume of interest.

2. The system of claim 1, wherein the selection module is configured to select one of the plurality of second event models stochastically.

3. The system of claim 2, wherein the selection module is configured to individually weight the plurality of second event models based on conformance to the local conditioning data corresponding to the second flow event, and wherein the stochastic selection of the selected second flow event is weighted based on the weights for the individual second event models.

4. The system of claim 1, wherein incorporation of the selected second event model into the model of the geologic volume of interest comprises adjusting the distribution of at least one of the one or more geologic parameters within the selected second event model to conform more precisely to the local conditioning data corresponding to the second flow event.

5. The system of claim 1, wherein the selection module is further configured to regressively reject previous second flow events.

6. The system of claim 1, wherein the event module dynamically self-positions the second flow event during generation of each second event model based additionally upon one or more topologic parameters of the geological area of interest.

7. A computer-method of modeling the geological architecture of a geologic volume of interest, wherein the method is implemented in a computer system comprising one or more processors configured to execute one or more computer program modules, the method comprising:

storing to an electronic storage medium that is accessible to the one or more processors, a model of a geologic volume of interest, wherein the stored model of the geologic volume of interest represents one or more geologic parameters of the geologic volume of interest as a function of position within the geologic volume of interest, wherein the model of the geologic volume of interest comprises a first event model of a first flow event within the geologic volume of interest, and wherein the first flow event corresponds to a first point in geologic time;

obtaining local conditioning data related to a second flow event within the geologic volume of interest, wherein the local conditioning data is derived from measurements of at least one of the one or more geologic parameters of the geologic volume of interest represented in the model of the geologic volume of interest, and wherein the second flow event corresponds to a second point in geologic time that is subsequent to the first point in geologic time;

determining, for the second flow event, constraints on the one or more geologic parameters represented by the model of the geologic volume of interest, wherein the constraints are determined based on the local conditioning data related to the second flow event;

generating a plurality of second event models, wherein generating each second event model comprises dynamic self-positioning of the second flow event from a proximal end to a distal end of the geologic volume of interest based on the one or more geologic parameters which conform to the constraints and one or more environmental conditions;

selecting one of the plurality of second event models for incorporation into the model of the geologic volume of interest; and incorporating the selected second event model into the model of the geologic volume of interest.

8. The method of claim 7, wherein selecting one of the plurality of second event models comprises selecting one of the plurality of second event models stochastically.

9. The method of claim 8, wherein selecting one of the plurality of second event models comprises: individually weighting the plurality of second event models based on conformance to the local conditioning data corresponding to the second flow event; and selecting one of the plurality of second events in a stochastic selection that is weighted based on the weights for the individual second event models.

10. The method of claim 7, wherein incorporating the selected second event model into the model of the geologic volume of interest comprises adjusting the distribution of at least one of the one or more geologic parameters within the selected second event model to conform more precisely to the local conditioning data corresponding to the second flow event.

11. The method of claim 7, wherein the selecting one of the plurality of second event models for incorporation into the model of the geologic volume of interest comprises regressively rejecting one or more previous second flow events.

12. The method of claim 7, wherein generating each second event model further comprises dynamically self-positioning the second flow event during generation of each second event model based upon one or more topologic parameters of the geological area of interest.

13. A computer-method of modeling the geological architecture of a geologic volume of interest, wherein the method is implemented in a computer system comprising one or more processors configured to execute one or more computer program modules, the method comprising:

(a) initializing the generation of a model of a geologic volume of interest, wherein the model of the geologic volume of interest represents one or more geologic parameters of the geologic volume of interest as a function of position within the geologic volume of interest;

(b) obtaining local conditioning data related to the geologic volume of interest, wherein the local conditioning data is derived from measurements of at least one of the one or more geologic parameters of the geologic volume of interest represented in the model of the geologic volume of interest;

(c) determining constraints on the one or more geologic parameters represented by the model of the geologic volume of interest for a first flow event corresponding to a first point in geologic time, wherein the constraints are determined based on the local conditioning data;

(d) stochastically generating a plurality of event models, wherein generating each event model comprises dynamic self-positioning of a flow event from a proximal end to a distal end of the geologic volume of interest based on the one or more geologic parameters determined in (c) and one or more environmental conditions;

(e) selecting one of the plurality of event models for incorporation into the model of the geologic volume of interest;

(f) incorporating the selected event model into the model of the geologic volume of interest; and (g) repeating operations (c)-(g) for at least one additional flow event within the geologic volume of interest corresponding to a point in geologic time subsequent to the first point in geologic time.

14. The method of claim 13, wherein (a) initializing the generation of a model of a geologic volume of interest comprises providing a baseline architecture, wherein the stochastic generation of the distributions of the plurality of event models at operation (d) is based on: the baseline architecture for the event models of the first flow event, and the selected event model of a previously modeled flow event for flow events corresponding to points in geologic time subsequent to the first point in geologic time.

15. The method of claim 13, wherein (f) incorporating the selected event model into the model of the geologic volume of interest comprises adjusting the distribution of at least one of the one or more geologic parameters within the selected event model to conform more precisely to the local conditioning data.

16. The method of claim 15, wherein (f) incorporating the selected event model into the model of the geologic volume of interest further comprises adjusting at least one of the one or more geologic parameters within the selected event model to reduce degradation of conformance with local conditioning data by subsequently modeled flow events.

17. The method of claim 13, wherein (e) selecting one of the plurality of event models for incorporation into the model of the geologic volume of interest comprises stochastically selecting one of the plurality of event models for incorporation into the model of the geologic volume of interest.

18. The method of claim 13, wherein (d) further comprises dynamically self-positioning the second flow event during generation of each second event model based upon one or more topologic parameters of the geological area of interest.

* * * * *